US011075804B2

(12) United States Patent
Hume et al.

(10) Patent No.: US 11,075,804 B2
(45) Date of Patent: Jul. 27, 2021

(54) NETWORK MODELING AND DEVICE CONFIGURATION BASED ON OBSERVED NETWORK BEHAVIOR

(71) Applicant: International Business Machines Corporation, Armonk, NY (US)

(72) Inventors: Michael S. Hume, New Maryland (CA); Rory F. Bray, Keswick Ridge (CA); Jason D. Keirstead, Fredericton (CA); Christopher I. Collins, Fredericton (CA); Steven W. R. Jones, Burtts Corner (CA)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 16/167,519

(22) Filed: Oct. 22, 2018

(65) Prior Publication Data

US 2020/0127893 A1    Apr. 23, 2020

(51) Int. Cl.
*G06F 15/16* (2006.01)
*H04L 12/24* (2006.01)
*H04L 29/06* (2006.01)

(52) U.S. Cl.
CPC ........ *H04L 41/0816* (2013.01); *H04L 41/065* (2013.01); *H04L 41/0618* (2013.01);
(Continued)

(58) Field of Classification Search
CPC .... H04L 41/12; H04L 63/1408; H04L 63/101
See application file for complete search history.

(56) References Cited

U.S. PATENT DOCUMENTS 6,255,943 B1 * 7/2001 Lewis ................... H04L 41/042
340/506
8,065,721 B1 * 11/2011 Shah ................... H04L 63/0209
726/13
(Continued)

FOREIGN PATENT DOCUMENTS

WO    2016196683 A1    12/2016
WO    2017147472 A1    8/2017

OTHER PUBLICATIONS

"Extreme Networks Security Information and Event Management (SIEM) & Security Analytics." RelNet Technologies.https://www.relnet.hu/en/termekcsaladok/extreme-networks-security-information-and-event-management-siem-security-analytics-0pp. 1-2.

*Primary Examiner* — Hieu T Hoang
(74) *Attorney, Agent, or Firm* — Robert C. Bunker (57) ABSTRACT

Methods and apparatus, including computer program products, implementing and using techniques for network modeling and device configuration. A security information and event manager is configured to receive log data from third party devices connected to a network. A notification is received each time a specific third party device generates a predetermined event in response to traffic at the specific third party device. The notification includes event information inferring network topology information, which network topology information includes third party device location information, firewall event information, source and destination networks. In response to receiving this information, a state of each third party device is generated, using inferred information over a predetermined period. An access control list is generated for each third party device, by using the inferred information over the predetermined period.

12 Claims, 3 Drawing Sheets

(52) U.S. Cl.
CPC ...... *H04L 41/0853* (2013.01); *H04L 41/0893* (2013.01); *H04L 41/12* (2013.01); *H04L 41/145* (2013.01); *H04L 41/22* (2013.01); *H04L 63/101* (2013.01); *H04L 63/1408* (2013.01)

(56) References Cited

U.S. PATENT DOCUMENTS

| | | | |
|---|---|---|---|
| 8,494,977 B1* | 7/2013 | Yehuda | G06Q 10/00 706/11 |
| 9,661,016 B2 | 5/2017 | Khuti et al. | |
| 2010/0217936 A1* | 8/2010 | Carmichael | C07D 413/10 711/118 |
| 2015/0082370 A1* | 3/2015 | Jayaraman | H04L 63/20 726/1 |
| 2015/0326594 A1* | 11/2015 | Chari | H04L 67/303 726/23 |
| 2016/0359872 A1* | 12/2016 | Yadav | H04L 43/04 |
| 2016/0359877 A1* | 12/2016 | Kulshreshtha | G06F 16/174 |
| 2017/0063927 A1* | 3/2017 | Schultz | H04L 63/20 |
| 2017/0085447 A1* | 3/2017 | Chen | G06F 16/248 |
| 2017/0279720 A1 | 9/2017 | Patnaik et al. | |
| 2018/0278498 A1* | 9/2018 | Zeng | H04L 43/045 |
| 2018/0302410 A1* | 10/2018 | Venkataraman | H04L 63/0263 |
| 2018/0359188 A1* | 12/2018 | Kim | H04L 47/20 |
| 2019/0036882 A1* | 1/2019 | Ding | H04L 63/0263 |
| 2019/0207907 A1* | 7/2019 | Savintsev | H04L 63/1441 |

\* cited by examiner

NETWORK MODELING AND DEVICE CONFIGURATION BASED ON OBSERVED NETWORK BEHAVIOR

BACKGROUND

The present invention relates to computer network devices, and more specifically, to configuring network devices.

Security Information and Event Management (SIEM) is an approach to security management that combines SIM (Security Information Management) and SEM (Security Event Management) functions into one security management system. SIEM systems aggregate relevant data from multiple sources, identify deviations from the norm and take appropriate action. For example, when a potential issue is detected, a STEM might log additional information, generate an alert and instruct other security controls to stop an activity's progress.

A SIEM system can be rules-based or employ a statistical correlation engine to establish relationships between event log entries. Advanced SIEMs have evolved to include User and Entity Behavior Analytics (UEBA) and Security Orchestration and Automated Response (SOAR). Most current SIEM systems work by deploying multiple collection agents in a hierarchical manner to gather security-related events from end-user devices, servers, network equipment, as well as specialized security equipment like firewalls, antivirus or intrusion prevention systems. The collectors forward events to a centralized management console where security analysts sift through the noise, connecting the dots and prioritizing security incidents.

In some systems, pre-processing may happen at edge collectors, with only certain events being passed through to a centralized management node. In this way, the volume of information being communicated and stored can be reduced. Although advancements in machine learning are helping systems to flag anomalies more accurately, analysts must still provide feedback, continuously educating the system about the environment.

The current popular model for network risk management in conjunction with a SIEM requires the tool to gather the network device configuration and display that information in a normalized format, for example, a Standard Element Document (SED), which is essentially an XML file that contains the normalized device configuration details that are generally used by the system to "draw" a network topology. These details include features such as device type/version information, network routing information, and firewall rule configurations. This provides network information to the user (visual network topology, device configuration, etc.), and allows the user to run attack simulations, ask the software questions about the state of their network, and query the topology over the actual/possible paths available throughout the network. This information is very valuable to a network administrator and can be used to tune the network configuration, identify assets that may have a poor security posture, as well as make decisions on how to better configure their network to limit security risks.

The current model requires that the administrator of the SIEM have physical/virtual access to the network devices. Typically, a SIEM will have adapters that it utilizes to connect to, run commands on, and pull back the configuration information of the third party networking devices (e.g., firewalls, routers, switches, IPS/IDS). The type of information that is gathered in this manner includes, for example:

Device type
Device Version
Firewall Rule Information
Routing information

In some cases, the administrators of these devices do not allow third party access directly to the devices. Without having device access, the SIEM network risk management solution is not as valuable as it could be.

SUMMARY

According to one embodiment of the present invention, methods, systems and computer program products are provided for network modeling and device configuration. A security information and event manager is configured to receive log data from third party devices connected to a network. A notification is received each time a specific third party device generates a predetermined event in response to traffic at the specific third party device. The notification includes event information inferring network topology information, which network topology information includes third party device location information, firewall event information, source and destination networks. In response to receiving this information, a state of each third party device is generated, using inferred information over a predetermined period. An access control list is generated for each third party device, by using the inferred information over the predetermined period The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

The various embodiments of the invention pertain to techniques for inferring device configurations based on event and flow data collected by a SIEM, as opposed to the current approach of developing tools to reach out and access third party vendor device to back up their configurations, and normalize them into a format that the SIEM can understand. By using this new technique, the SIEM administrator no longer requires to access devices that may be inaccessible due to their security clearance, location, internal policies, etc.

The SIEM Risk Management tools also use this information to draw a topology map of the network that the user can than query and traverse. A good portion of this information can be inferred based on the events and flows that are monitored by the SIEM software. This inferred information could be used to, for example, infer device configurations and provide much of the same functionality as the current systems provide, but without the need to provide access to the networking device. For those situations where not all of the devices can be directly connected to the SIEM, or in situations where access is prohibited, over time this would allow for a "poor-man's" view of the network topology.

By removing the requirement to have access to these devices to pull their configuration, a large barrier is removed and the user is now able to utilize the features of the network risk manager to be used on data that has been inferred instead. This provides the network user with the ability to gain a high level view of their overall network and network security without using intrusive means to gain access to third party network device configurations.

Figure 1:
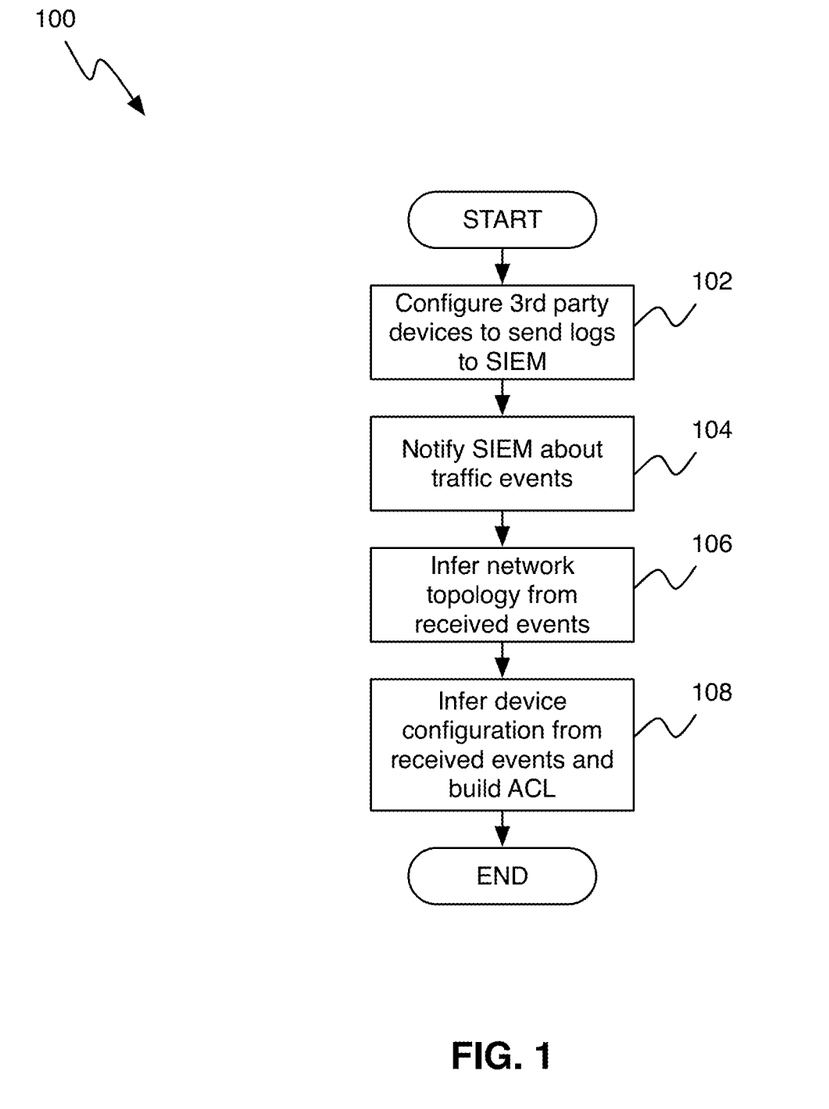
FIG. 1 shows computer-implemented process for network modeling and device configuration, in accordance with one embodiment.

With reference now to FIG. 1, a process 100 for network modeling and device configuration in accordance with one embodiment will now be described. As can be seen in FIG. 1, the process 100 starts by a user configuring third party devices to send their logs to the SIEM, step 102. In the illustrated embodiment, this configuration is done once, and does not always require the SIEM to have access to the systems to run commands on.

Once configured, the SIEM gets notified every time that specific device al lows/denies/blocks/etc., traffic that it sees, step 104. This can be done, for example, by configuring the device to send "syslog" messages to a collector in the SIEM network, which passes on the messages to a Risk Manager module.

The Risk Manager module can then from the received messages infer network topology information, step 106. The inferred information can include, for example:
- Device Type (via log source configuration, based on the manual/automatic log source configuration stored in the SIEM)
- Device Location (via host name/identifier, including the networking device's IP address)
- Firewall event information (srcIP, dstIP, Payload, Port, etc)
- Source and destination networks.

For example, a syslog from a firewall event may look something like:
% FWSM-4-106023: Deny tcp src outside:101120.50/500 dst inside-104:222.222.222.222/500 by access-group "INSIDE_OUT"

From this payload, the following information can be identified:
- Location/hostnanie of the device (gathered by the SIEM log source configuration)
- Event type: Deny
- Source IP and port: 10.1.120.50:500
- Destination IP and port: 222.277.277.277:500
- ACL name; INSIDE OUT As the skilled person realizes, the more information the Risk Manager module receives over time, the more detailed information is obtained about the device's configuration. Therefore, using this information over a certain amount of time, the system can develop a picture of the state of each device and build an ACL for each device, step 108. This ends the process 100.

It should be noted that over time it is also possible to detect when a change to the third party device has been made. This can be illustrated using the following example: Busy network devices might receive hundreds of events a second. Each of these events "hits" one of the rules. In this example, assume that there is a rule that does the following:
Allow Traffic from Source IP 10.1.120.50 Port 500 to Port 600 to Dest IP 222.222.222.222 on port 500 to Port 600. (Note the port range here)

The system builds the Rule from SrcIP to DstIP and as the ports start getting hit, the system can start expanding the rule to include the full port range. For example, events coming in on port 500, 501, 502, etc., would cause the rule to slowly expand as described in the following example. In the SIEM, each event that matches this rule would come in and be evaluated, initially, assume that an event (or configured threshold of events) hits port 500. This would cause the SIEM to create an inferred rule that matches that traffic.

As seen in the port range, the possible events can range from port 500-600. Now assume that events are received on port 502. A new rule will then be created that matches that. Next, if an event comes in on port 501, the system can see that the rule must be a range, and would merge the three rules (for port 500, 501, and 502, respectively) into a single rule that covers the 500-502 port range. It should be noted that while ports have been used in this example, the same principles can also be applied to CIDR ranges, etc.

Now, if a change is made, for example, if someone changes the firewall to now DENY traffic on Ports 550-600, there will now be an increasing number of DENY events instead of ALLOW events. This will be detected by the system, and a notification will be generated. As is well known to those having ordinary skill in the art, in a SIEM there are configurable rules that trigger notifications. These notifications typically get routed to administrators or security operations personnel, depending on the settings in the rule sets. In this case, the notifications may contain a message that indicates that a rule change has been detected, based on the historical data that the SIEM has gathered over time. For example, "Notify me any time a ruleset (of a specific age) changes." Having the limitation "of a specific age" is important in order to keep new rules from constantly causing false alarms. This would allow the administrator to review the change and discuss it with the device administrators if they felt the rule change was detrimental for security.

In some embodiments, the system can also start adjusting the rules and create a new entry or adjust the existing entry. That is, as the system detects changes, it would constantly be evaluated against its known rules. For example, assume a rule that states "ALLOW from IP-A to IP-B Port 500-600." This is detected and monitored by the SIEM and the inferred rule is created in the SIEM.

The firewall administrator then changes the rule to "DENY from to Port 550-600." The system detects this configuration change, notifies the SIEM administrator, and starts to adjust the inferred rule from this from "ALLOW from IP-A to IP-B Port 500-600" to "ALLOW from IP-A to IP-B Port 500-549" and "DENY from IP-A to IP-B Port 550-600." This is done automatically and does not require the SIEM to base the rules on anything by observed behavior of the device.

In addition, in some embodiments, it is possible to take "snapshots" of the inferred device configuration and save them for future reference, and display the current state of the device to the user. For example, the system can "export" a generic snapshot SED (i.e., an XML file) of the device's configuration at a certain point in time. Conventional systems typically keep track of all previous device backups. In accordance with the various embodiments of the invention described herein, though, instead of maintaining the actual backups, a history of the device configuration is kept as the system detects configuration changes, which allows the administrator to review the impact the changes have had on their security posture. These changes can be used, for example, to review whether a firewall administrator has made a change that might be deemed too restrictive or too relaxed.

Figure 2:
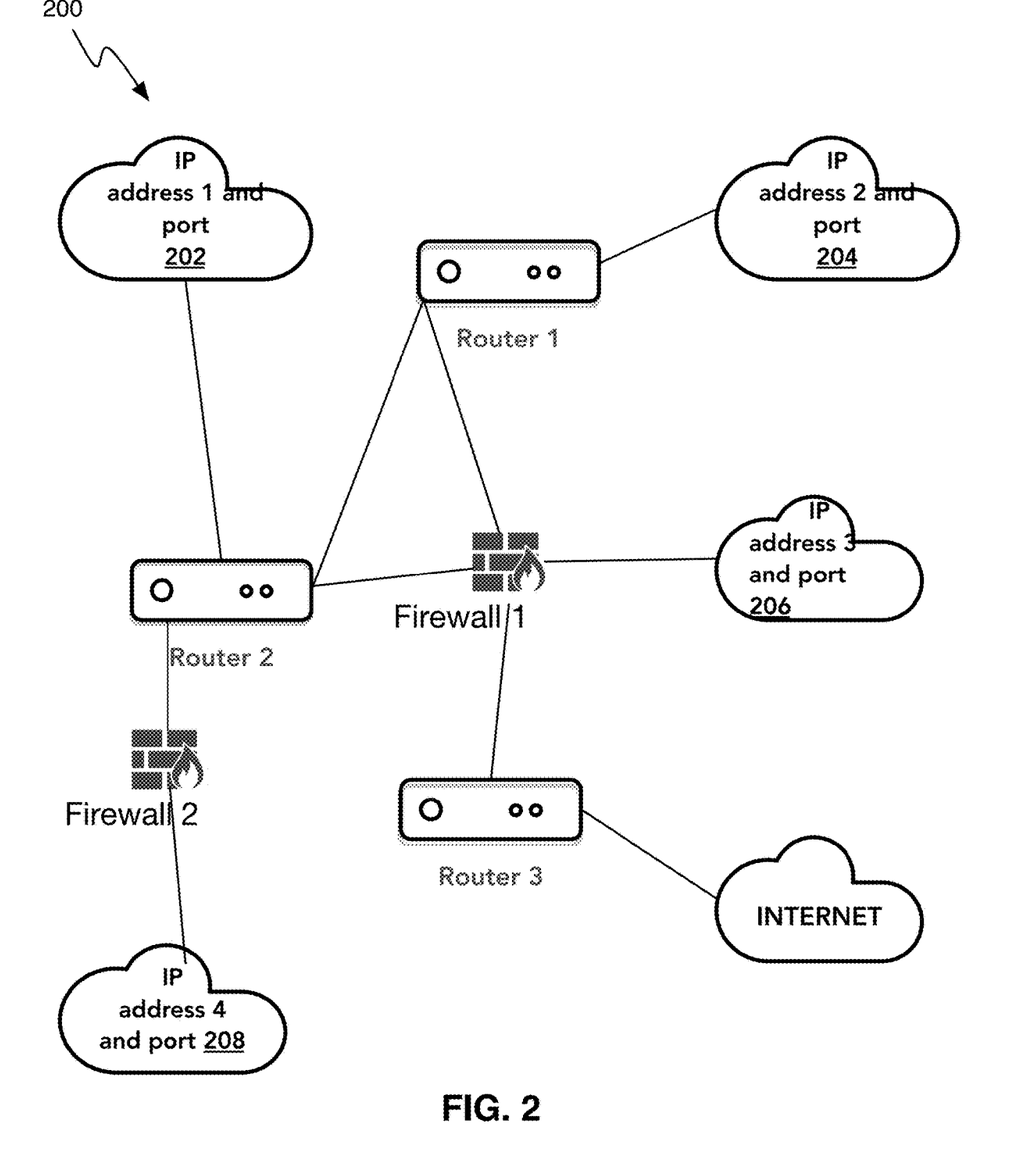
FIG. 2 shows an example of a network topology graph generated in accordance with one embodiment of the invention.

In addition, when taking into account the network flow information, a topology graph can be generated and displayed to the user. The topology graph provides a graphical representation of the all the network based traffic have received through the SIEM. FIG. 2 shows a schematic example of such a network topology graph 200 generated in accordance with one embodiment. As can be seen in FIG. 2, the network topology graph 200 includes devices 202-208 from which the SIEM can receive event/network flows. For example, the SIEM can receive all events/flows from any of the devices 202-208 in this topology graph, and specifically infer the traffic that it is receiving, and graphically draw this topology graph.

In various embodiments, this is done by inferring the subnets that are in the network. For example, if there was the following event: "IP Address 1 to IP Address 4 on Port 500," this event combined with the network flow information that was received by the SIEM allows the SIEM to infer that there are assets in IP Address 1's subnet with port 500 open, and IP Address 4's subnet with port 500 open. It can also infer the type of firewall (based on knowing the standardized log format from the device—for example, a Checkpoint Firewall's format, is different from a CISCO Firewall's format). As the traffic flows into the SIEM, the system can start to draw a simple topology graph based on inferred data, and that graph will become more complex the more data that it ingests and the more rules that have been inferred from the events at each device. In some embodiments, the SIEM can also use the event data to "ask questions," such as "Based on the observed data that has been ingested, is it possible to reach IP Address 3 from IP Address 1 on port 500?"

Figure 3:
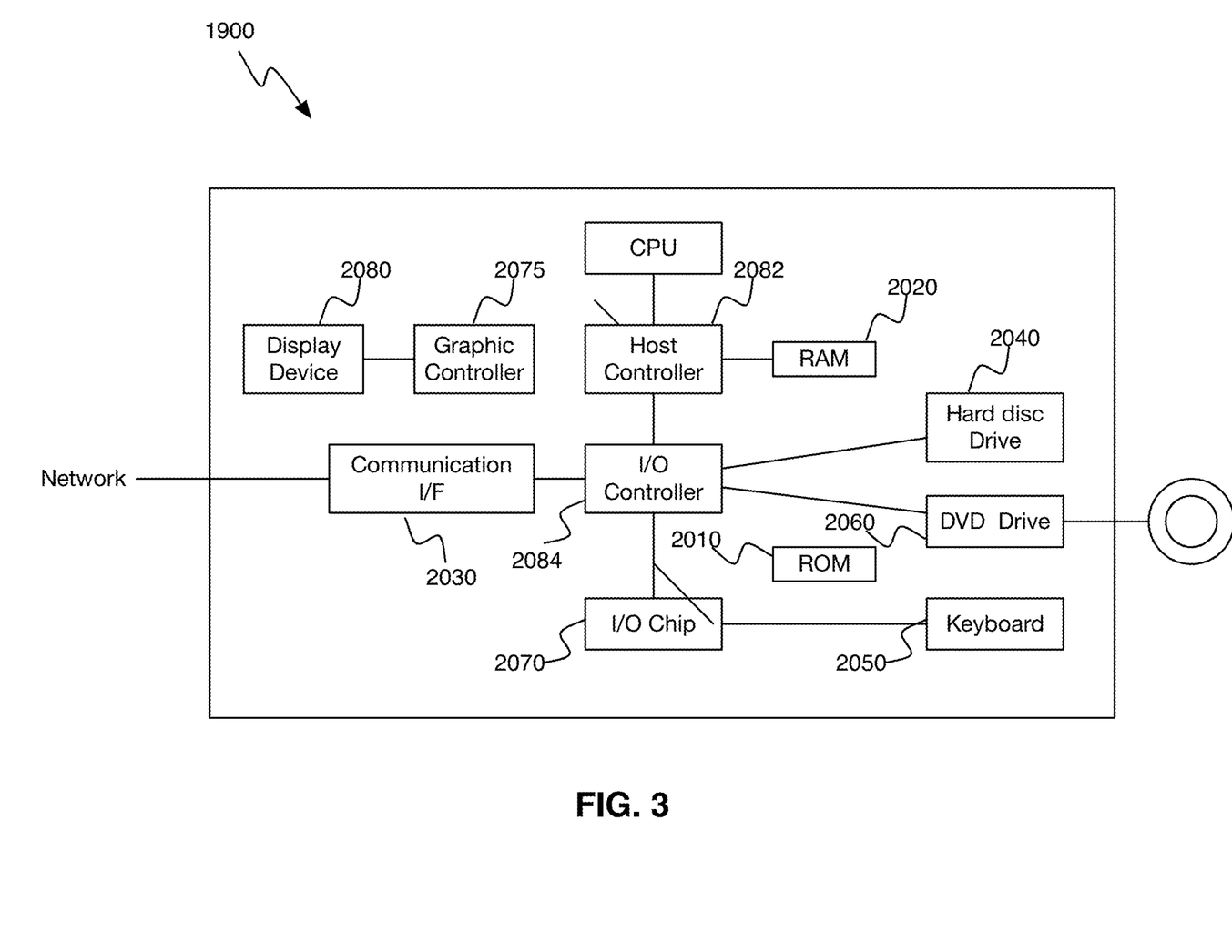
FIG. 3 shows an exemplary configuration of a computer 1900 in accordance with one embodiment.

FIG. 3 shows an exemplary configuration of a computer 1900 in accordance with one embodiment. The computer 1900 according to the present embodiment includes a CPU 2000, a RAM 2020, a graphics controller 2075, and a display apparatus 2080 which are mutually connected by a host controller 2082. The computer 1900 also includes input/output units such as a communication interface 2030, a hard disk drive 2040, and a DVD-ROM drive 2060 which are connected to the host controller 2082 via an input/output controller 2084. The computer also includes legacy input/output units such as a ROM 2010 and a keyboard 2050 which are connected to the input/output controller 2084 through an input/output chip 2070.

The host controller 2082 connects the RAM 2020 with the CPU 2000 and the graphics controller 2075 which access the RAM 2020 at a high transfer rate. The CPU 2000 operates according to programs stored in the ROM 2010 and the RAM 2020, thereby controlling each unit. The graphics controller 2075 obtains image data generated by the CPU 2000 on a frame buffer or the like provided in the RAM 2020, and causes the image data to be displayed on the display apparatus 2080. Alternatively, the graphics controller 2075 may contain therein a frame buffer or the like for storing image data generated by the CPU 2000.

The input/output controller 2084 connects the host controller 2082 with the communication interface 2030, the hard disk drive 2040, and the DVD-ROM drive 2060, which are relatively high-speed input/output units. The communication interface 2030 communicates with other electronic devices via a network. The hard disk drive 2040 stores programs and data used by the CPU 2000 within the computer 1900. The DVD-ROM drive 2060 reads the programs or the data from the DVD-ROM 2095, and provides the hard disk drive 2040 with the programs or the data via the RAM 2020.

The ROM 2010 and the keyboard 2050 and the input/output chip 2070, which are relatively low-speed input/output units, are connected to the input/output controller 2084. The ROM 2010 stores therein a boot program or the like executed by the computer 1900 at the time of activation, a program depending on the hardware of the computer 1900. The keyboard 2050 inputs text data or commands from a user, and may provide the hard disk drive 2040 with the text data or the commands via the RAM 2020. The input/output chip 2070 connects a keyboard 2050 to an input/output controller 2084, and may connect various input/output units via a parallel port, a serial port, a keyboard port, a mouse port, and the like to the input/output controller 2084.

A program to be stored on the hard disk drive 2040 via the RAM 2020 is provided by a recording medium as the DVD-ROM 2095, and an IC card. The program is read from the recording medium, installed into the hard disk drive 2040 within the computer 1900 via the RAM 2020, and executed in the CPU 2000.

A program that is installed in the computer 1900 and causes the computer 1900 to function as an apparatus implementing the process 100 of FIG. 1, includes a SIEM Risk Management module.

The information processing described in these programs is read into the computer 1900, to function as the determining section, which is the result of cooperation between the program or module and the above-mentioned various types of hardware resources. Moreover, the apparatus is constituted by realizing the operation or processing of information in accordance with the usage of the computer 1900.

For example, when communication is performed between the computer 1900 and an external device, the CPU 2000 may execute a communication program loaded onto the RAM 2020, to instruct communication processing to a communication interface 2030, based on the processing described in the communication program. The communication interface 2030, under control of the CPU 2000, reads the transmission data stored on the transmission buffering region provided in the recording medium, such as a RAM 2020, a hard disk drive 2040, or a DVD-ROM 2095, and transmits the read transmission data to a network, or writes reception data received from a network to a reception buffering region or the like provided on the recording medium. In this way, the communication interface 2030 may exchange transmission/reception data with the recording medium by a DMA (direct memory access) method, or by a configuration that the CPU 2000 reads the data from the recording medium or the communication interface 2030 of a transfer destination, to write the data into the communication interface 2030 or the recording medium of the transfer destination, so as to transfer the transmission/reception data.

In addition, the CPU 2000 may cause all or a necessary portion of the file of the database to be read into the RAM 2020, such as by DMA transfer, the file or the database having been stored in an external recording medium such as the hard disk drive 2040, the DVD-ROM drive 2060 (DVD-ROM 2095) to perform various types of processing onto the data on the RAM 2020. The CPU 2000 may then write back the processed data to the external recording medium by means of a DMA transfer method or the like. In such processing, the RAM 2020 can be considered to temporarily store the contents of the external recording medium, and so the RAM 2020, the external recording apparatus, and the like are collectively referred to as a memory, a storage section, a recording medium, a computer readable medium, etc. Various types of information, such as various types of programs, data, tables, and databases, may be stored in the recording apparatus, to undergo information processing. Note that the CPU 2000 may also use a part of the RAM 2020 to perform reading/writing thereto on the cache memory. In such an embodiment, the cache is considered to be contained in the RAM 2020, the memory, and/or the recording medium unless noted otherwise, since the cache memory performs part of the function of the RAM 2020.

The CPU 2000 may perform various types of processing, onto the data read from the RAM 2020, which includes various types of operations, processing of information, condition judging, search/replace of information, etc., as described in the present embodiment and designated by an instruction sequence of programs, and writes the result back to the RAM 2020. For example, when performing condition judging, the CPU 2000 may judge whether each type of variable shown in the present embodiment is larger, smaller, no smaller than, no greater than, or equal to the other variable or constant, and when the condition judging results in the affirmative (or in the negative), the process branches to a different instruction sequence, or calls a sub routine.

In addition, the CPU 2000 may search for information in a file, a database, etc., in the recording medium. For example, when a plurality of entries, each having an attribute value of a first attribute is associated with an attribute value of a second attribute, are stored in a recording apparatus, the CPU 2000 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1900 via the network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for network modeling and device configuration, comprising:
   in response to configuring a security information and event manager to receive log data from third party devices connected to a network, receiving a notification each time a specific third party device generates a predetermined event in response to traffic at the specific third party device;
   in response to receiving the notification, the notification including event information inferring network topology information including third party device location information, firewall event information, source and destination networks, wherein the firewall event information includes a source IP address, a destination IP address, and a port range:
   generating a state of each third party device using inferred information over a predetermined period, wherein the generated state includes a history of device configurations, and wherein the inferred information includes generating an inferred firewall rule based on the firewall event information and detected changes to the port range over time; and
   generating an access control list for each third party device using the inferred information over the predetermined period;
   detecting when a configuration change to the third party device has occurred based on comparing a new event from the third party device to the history of device configurations; and
   in response to detecting the configuration change and determining that a rule set age threshold associated with the detected configuration change is exceeded, routing the notification to one or more administrators or security operations personnel.

2. The method of claim 1, further comprising:
   generating and saving a snapshot of an inferred device configuration of the third party device.

3. The method of claim 1, further comprising:
   displaying a current state of the device to a user.

4. The method of claim 1, further comprising:
   displaying a topology graph of the network.

5. A computer program product for network modeling and device configuration, the computer program product comprising a computer readable storage medium having program instructions embodied therewith, wherein the computer readable storage medium is not a transitory signal per se, the program instructions being executable by a processor to cause the processor to perform a method comprising:
   in response to configuring a security information and event manager to receive log data from third party devices connected to a network, receiving a notification each time a specific third party device generates a predetermined event in response to traffic at the specific third party device;
   in response to receiving the notification, the notification including event information inferring network topology information including third party device location information, firewall event information, source and destination networks, wherein the firewall event information includes a source IP address, a destination IP address, and a port range:
   generating a state of each third party device using inferred information over a predetermined period, wherein the generated state includes a history of device configurations, and wherein the inferred information includes generating an inferred firewall rule based on the firewall event information and detected changes to the port range over time; and
   generating an access control list for each third party device using the inferred information over the predetermined period;
   detecting when a configuration change to the third party device has occurred based on comparing a new event from the third party device to the history of device configurations; and
   in response to detecting the configuration change and determining that a rule set age threshold associated with the detected configuration change is exceeded, routing the notification to one or more administrators or security operations personnel.

6. The computer program product of claim 5, further comprising:
   generating and saving a snapshot of an inferred device configuration of the third party device.

7. The computer program product of claim 5, further comprising:
   displaying a current state of the device to a user.

8. The computer program product of claim 5, further comprising:
   displaying a topology graph of the network.

9. A system for network modeling and device configuration, comprising:
   a processor; and
   a memory containing instructions that when executed by the processor causes the following method to be performed:
   in response to configuring a security information and event manager to receive log data from third party devices connected to a network, receiving a notification each time a specific third party device generates a predetermined event in response to traffic at the specific third party device;
      in response to receiving the notification, the notification including event information inferring network topology information including third party device location information, firewall event information, source and destination networks, wherein the firewall event information includes a source IP address, a destination IP address, and a port range:
         generating a state of each third party device using inferred information over a predetermined period, wherein the generated state includes a history of device configurations, and wherein the inferred information includes generating an inferred firewall rule based on the firewall event information and detected changes to the port range over time; and
         generating an access control list for each third party device using the inferred information over the predetermined period;
      detecting when a configuration change to the third party device has occurred based on comparing a new event from the third party device to the history of device configurations; and
      in response to detecting the configuration change and determining that a rule set age threshold associated with the detected configuration change is exceeded, routing the notification to one or more administrators or security operations personnel.

10. The system of claim 9, wherein the method further comprises:
    generating and saving a snapshot of an inferred device configuration of the third party device.

11. The system of claim 9, wherein the method further comprises:
    displaying a current state of the device to a user.

12. The system of claim 9, wherein the method further comprises:
    displaying a topology graph of the network.

* * * * *